(12) United States Patent
Bell et al.

(10) Patent No.: US 8,894,885 B2
(45) Date of Patent: Nov. 25, 2014

(54) APPARATUS AND METHODS FOR TAR REMOVAL FROM SYNGAS

(75) Inventors: Peter S. Bell, Fayetteville, AR (US);
Ching-Whan Ko, Fayetteville, AR (US);
Joseph Golab, Super Grove, IL (US);
Bernard Descales, Marseilles (FR);
Julien Eyraud, Marignane (FR)

(73) Assignee: Ineos Bio SA, Rolle (CH)

( * ) Notice: Subject to any disclaimer, the term of this patent is extended or adjusted under 35 U.S.C. 154(b) by 195 days.

(21) Appl. No.: 13/427,193

(22) Filed: Mar. 22, 2012

(65) Prior Publication Data

US 2012/0256130 A1 Oct. 11, 2012

Related U.S. Application Data

(60) Provisional application No. 61/516,646, filed on Apr. 6, 2011, provisional application No. 61/516,704, filed on Apr. 6, 2011, provisional application No. 61/516,667, filed on Apr. 6, 2011.

(51) Int. Cl.
| | | |
|---|---|---|
| *C01B 3/38* | (2006.01) | |
| *C10J 3/72* | (2006.01) | |
| *C10J 3/84* | (2006.01) | |
| *C10J 3/86* | (2006.01) | |
| *C10K 3/00* | (2006.01) | |
| *C10K 1/04* | (2006.01) | |
| *F22B 1/18* | (2006.01) | |
| *C10K 1/02* | (2006.01) | |

(52) U.S. Cl.
CPC .... *C10J 3/72* (2013.01); *C10J 3/84* (2013.01);
*C10J 3/86* (2013.01); *C10K 3/005* (2013.01);
*C10K 3/008* (2013.01); *C10J 3/723* (2013.01);
*C10J 3/726* (2013.01); *C10K 1/04* (2013.01);
*C10J 3/721* (2013.01); *F22B 1/1838* (2013.01);
*C10K 3/003* (2013.01); *C10K 1/02* (2013.01);
*C01B 2203/0877* (2013.01); *C01B 2203/0894* (2013.01); *C10J 2300/1884* (2013.01); *C10J 2300/0956* (2013.01); *C01J 2300/0959* (2013.01); *Y02E 50/17* (2013.01); *Y02E 50/32* (2013.01); *Y02E 50/343* (2013.01); *C10J 2300/1606* (2013.01); *C10J 2300/1846* (2013.01); *Y02T 10/16* (2013.01)
USPC ........................................................ 252/373

(58) Field of Classification Search
USPC ........................................................ 252/373
See application file for complete search history.

(56) References Cited

U.S. PATENT DOCUMENTS

| | | |
|---|---|---|
| 3,980,592 A | 9/1976 | Marion |
| 4,017,271 A | 4/1977 | Barclay et al. |

(Continued)

FOREIGN PATENT DOCUMENTS

| | | |
|---|---|---|
| DE | 102008027858 | 12/2009 |
| EP | 1918352 | 11/2006 |

(Continued)

OTHER PUBLICATIONS

International Search Report—PCT/US2012/032168, dated Apr. 16, 2012 (3 pgs.).

(Continued)

*Primary Examiner* — Melvin C Mayes
*Assistant Examiner* — Kenneth Vaden
(74) *Attorney, Agent, or Firm* — Ineos USA LLC (57) ABSTRACT

A process and apparatus are provided for reducing content of tar in a tar containing syngas. The process includes contacting the tar containing syngas with a molecular oxygen containing gas in a first reaction zone to produce a gas mixture. The gas mixture is passed through a heat treatment zone maintained at a temperature between about 900° C. to about 2000° C. for a contact time of about 0.5 to about 5 seconds. In this aspect, at least a portion of the tar undergoes at least partial oxidation and/or cracking to produce a hot syngas.

11 Claims, 6 Drawing Sheets

(56) References Cited

U.S. PATENT DOCUMENTS

| | | |
|---|---|---|
| 4,238,403 A | 12/1980 | Pinto |
| 4,805,562 A | 2/1989 | Davis et al. |
| 4,823,741 A | 4/1989 | Davis |
| 5,145,491 A | 9/1992 | Schmitt et al. |
| 6,033,447 A | 3/2000 | Moock et al. |
| 7,285,402 B2 | 10/2007 | Gaddy |
| 7,923,476 B2 | 4/2011 | Young |
| 7,932,298 B2 | 4/2011 | Young |
| 2005/0095183 A1 | 5/2005 | Rehmat |
| 2007/0266634 A1 | 11/2007 | Tsangarais |
| 2008/0115415 A1 | 5/2008 | Agrawal et al. |
| 2008/0169449 A1 | 7/2008 | Mundschau |
| 2008/0209807 A1 | 9/2008 | Tsangaris |
| 2008/0210089 A1 | 9/2008 | Tsangaris |
| 2008/0244976 A1 | 10/2008 | Paisley |
| 2008/0280236 A1 | 11/2008 | Wright |
| 2009/0018221 A1 | 1/2009 | Klepper |
| 2009/0018222 A1 | 1/2009 | Klepper |
| 2009/0064581 A1 | 3/2009 | Nielsen et al. |
| 2009/0090053 A1 | 4/2009 | Feldmann |
| 2009/0156695 A1 | 6/2009 | Young |
| 2009/0260286 A1 | 10/2009 | Sasauchi et al. |
| 2010/0044643 A1 | 2/2010 | Wallace |
| 2010/0180503 A1 | 7/2010 | Yokohama et al. |
| 2010/0224835 A1 | 9/2010 | Chornet et al. |
| 2010/0256246 A1 | 10/2010 | Carryer |
| 2010/0317077 A1 | 12/2010 | Gaddy et al. |
| 2011/0248218 A1 | 10/2011 | Sutradhar |
| 2011/0250661 A1 | 10/2011 | Sutradhar |
| 2011/0250662 A1 | 10/2011 | Sutradhar |

FOREIGN PATENT DOCUMENTS

| | | |
|---|---|---|
| WO | 9318341 | 9/1993 |
| WO | 2006/123018 | 11/2006 |
| WO | WO2007/048058 A2 | 4/2007 |
| WO | 2007112101 | 10/2007 |
| WO | 2007117157 | 10/2007 |
| WO | 2007131241 | 11/2007 |
| WO | 2008098311 | 8/2008 |
| WO | WO2009/023364 A2 | 2/2009 |
| WO | 2009076138 | 6/2009 |
| WO | 2009112334 | 9/2009 |
| WO | WO2009/106357 A2 | 9/2009 |
| WO | 2009154788 | 12/2009 |
| WO | WO2009/155697 A1 | 12/2009 |

OTHER PUBLICATIONS

International Search Report—PCT/US2012/032174, dated Aug. 20, 2012 (3 pgs.).
International Search Report—PCT/US2012/032160, dated Aug. 30, 2012 (4 pgs.).
Co-pending Applications: U.S. Appl. Nos. 13/427,144, filed Mar. 22, 2012, 13/427,247, filed Mar. 22, 2012, 13/249,299, filed Dec. 13, 2011, 13/324,321, filed Dec. 13, 2011.
Houben et al., Tar Reduction through Partial Combustion of Fuel Gas, Fuel 84(2005): 817-824.
Van Der Hoeven et al., Analysis of Hydrogen Influence on Tar Removal by Partial Oxidation, Fuel 85(2006): 1101-1110.
Written Opinion of the International Searching Authority; PCT/US2012032006; International Filing Date Mar. 4, 2012; 12 pages.
Written Opinion of the International Searching Authority; PCT/US2012/032180; International Filing Date Apr. 4, 2012; 10 pages.

(III)

APPARATUS AND METHODS FOR TAR REMOVAL FROM SYNGAS

This application claims the benefit of U.S. Provisional Application Nos. 61/516,646, 61/516,704 and 61/516,667 all filed Apr. 6, 2011, all of which are incorporated in their entirety herein by reference.

An apparatus and method is provided for gasification of carbonaceous materials to produce producer gas or synthesis gas or syngas that includes carbon monoxide and hydrogen. More specifically, the apparatus and method are effective for conditioning of producer gas or synthesis gas or syngas and reducing tar content of a tar-containing syngas.

BACKGROUND

Gasification of carbonaceous materials in an oxygen-starved condition produces syngas (also known as synthesis gas; also known as producer gas) comprising tar. Presence of tar in syngas poses major technical obstacle in gasification process causing fouling, plugging of downstream processes and equipment. Condensing tar can dramatically foul gas cleaning equipment and liquid tar droplets that enter prime movers hamper the operation of these end-use applications of the syngas. Tar in syngas may also greatly impact wastewater management. If tar and condensed water are mixed, e.g., in conventional water-based gas cleaning systems, it may create an often costly and difficult water treatment problem. In order to have a syngas acceptable for downstream processes and equipment content of tar in syngas has to be reduced. Several methods of reduction or removal of tar have been disclosed in the published art that include both physical and chemical treatment. Physical treatments for tar removal include use of filter and electrostatic tar removal. Chemical treatments include both catalytic and non-catalytic methods. One method of reducing tar content of syngas is thermal destruction in which tar undergoes one or both of partial oxidation and thermal cracking. See for example: "Tar reduction through partial combustion of fuel gas," Houben, M. P, Lange, H. C. de & Steenhoven, A. A. van, Fuel, vol. 84, pp 817-824, 2005; "Analysis of hydrogen-influence on tar removal by partial oxidation," Hoeven, T. A. van der, Lange, H. C. de & Steenhoven, A. A. van, Fuel, vol. 85, pp 1101-1110, 2005.

In this method, tar containing syngas produced from a gasifier unit is passed through a treatment zone or unit wherein an oxygen-containing gas is added. A high temperature in is attained in this unit in order to accomplish tar cracking and/or partial oxidation. Thus James T. Cobb, Jr. ("Production of Synthesis Gas by Biomass Gasification," James T. Cobb, Jr, Proceedings of the 2007 Spring National AIChE Meeting, Houston, Tex., Apr. 22-26, 2007) describes a Consutech Gasifier (BRI Energy LLC), first stage of which is a standard step-grate combustor (frequently used as an MSW incinerator) that operates as a gasifier at 950° F. using oxygen-enriched air. The second stage is a heat treater that operates at 2000-2250° F. and uses minimal oxygen to crack tars.

WO 2009/154788 describes a two stage gasifier in which gaseous product from the first stage moves to the second stage. Pure oxygen is introduced into the second stage to raise the temperature to about 1750 to about 2250° F. in order to accomplish one or more of partial oxidation and cracking of tar contained in the gaseous stream from the first stage.

The above described thermal treatment method has been shown to be effective in reducing tar content of syngas in small size unit. There remains a need for developing knowledge for scale-up of this thermal treatment process in order to accomplish effective tar removal in large scale units.

SUMMARY

A process is provided for reducing content of tar in a tar containing syngas. The process includes contacting the tar containing syngas with a molecular oxygen containing gas in a first reaction zone to produce a gas mixture. The gas mixture is passed through a heat treatment zone maintained at a temperature between about 900° C. to about 2000° C. for a contact time of about 0.5 to about 5 seconds. In this aspect, at least a portion of the tar undergoes at least partial oxidation and/or cracking to produce a hot syngas. The gas mixture from the first reaction zone changes direction of flow by impingement on a surface.

In one aspect, a linear velocity of a flow of the tar containing syngas oxygen mixture at an exit of the first reaction zone is greater than about 5 meters per second. At least a portion of hot syngas may be introduced into the first reaction zone. In another aspect, a ratio of linear velocity to height of the heat treatment zone is about 0.3:12.5 to about 2.0:2.5. In one aspect, the heat treatment zone includes: (a) a first heat treatment zone effective for thermal treatment of tar contained in the gas mixture to produce a less tar containing gas mixture; and (b) a second heat treatment zone effective for thermal treatment of tar contained in said less tar containing gas mixture to produce hot syngas.

A tar removal apparatus is provided that is effective for reducing content of tar in a tar containing syngas to produce a hot syngas. The tar removal apparatus includes: (a) a first reaction zone wherein molecular oxygen is introduced and mixed with said tar containing syngas to produce a gas mixture; and (b) a heat treatment zone for thermal treatment of tar contained in the gas mixture. The gas mixture from the first reaction zone changes direction of flow by impingement on a surface. The heat treatment zone provides a contact time of about 0.5 to about 5 seconds. In one aspect, the first reaction zone provides a linear velocity of flow of the tar containing syngas oxygen mixture greater than about 5 meters per second at the exit of the first reaction zone. In another aspect, the heat treatment zone of the tar removal apparatus includes: (a) a first heat treatment zone for thermal treatment of tar contained in the gas mixture to produce a less tar containing gas mixture; and (b) a second heat treatment zone for thermal treatment of tar contained in the less tar containing gas mixture to produce hot syngas. The tar removal apparatus is effective for providing a gas mixture from the first reaction zone that impinges on a surface in less than about 2 seconds.

A syngas production apparatus is provided that includes (a) a gasification zone wherein a carbonaceous material is contacted with molecular oxygen and optionally contacted with one or more of steam and carbon dioxide to produce a tar containing syngas; (b) a first reaction zone wherein molecular oxygen is introduced and mixed with the tar containing syngas to produce a gas mixture; and (c) a heat treatment zone for thermal treatment of tar contained in the tar containing syngas oxygen mixture. The tar containing syngas oxygen mixture from the first reaction zone changes direction of flow by impingement on a surface and the heat treatment zone provides a contact time of about 0.5 to about 5 seconds.

A process for reducing content of tar in a tar containing syngas is provided. The process includes: contacting said tar containing syngas with a molecular oxygen containing gas in a first reaction zone to produce a gas mixture; and passing the gas mixture through a heat treatment zone at a temperature and for a time effective for reducing tar content of the syngas by at least about 10%. The gas mixture from the first reaction zone changes direction of flow by impingement on a surface.

BRIEF DESCRIPTION OF FIGURES

The above and other aspects, features and advantages of several aspects of the process will be more apparent from the following drawings.

FIG. 1 illustrates one aspect of the apparatus that includes a First reaction zone and a Heat Treatment Zone.

FIG. 2 illustrates one aspect of the apparatus that includes a First reaction zone and a Heat Treatment Zone comprising Heat Treatment Zone I and Heat Treatment Zone II.

FIG. 3 illustrates one aspect of the apparatus that includes a Gasification Zone, a First reaction zone and a Heat Treatment Zone that includes a Heat Treatment Zone I and Heat Treatment Zone II.

FIGS. 4 (I) & 4 (II) present side views of aspects of the first reaction zone wherein the first reaction zone is vertical and gas inlet for molecular oxygen is inclined at an angle to horizontal line. FIGS. 4 (III) & 4 (IV) present top views or cross sections of aspects of the first reaction zone wherein the first reaction zone is vertical and gas inlet for molecular oxygen is inclined at an angle to a diagonal drawn through point of intersection of the cross section and axis of the gas inlet.

FIGS. 6 (I) & 6 (II) present side views of aspects of the first reaction zone wherein the first reaction zone is inclined at an angle to a vertical line.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various aspects of the present process and apparatus. Also, common but well-understood elements that are useful or necessary in commercially feasible aspects are often not depicted in order to facilitate a less obstructed view of these various aspects.

DETAILED DESCRIPTION

Definitions

Unless otherwise defined, the following terms as used throughout this specification for the present disclosure are defined as follows and can include either the singular or plural forms of definitions below defined:

The term "about" modifying any amount refers to the variation in that amount encountered in real world conditions, e.g., in the lab, pilot plant, or production facility. For example, an amount of an ingredient or measurement employed in a mixture or quantity when modified by "about" includes the variation and degree of care typically employed in measuring in an experimental condition in production plant or lab. For example, the amount of a component of a product when modified by "about" includes the variation between batches in a multiple experiments in the plant or lab and the variation inherent in the analytical method. Whether or not modified by "about," the amounts include equivalents to those amounts. Any quantity stated herein and modified by "about" can also be employed in the present disclosure as the amount not modified by "about".

"Carbonaceous material" as used herein refers to carbon rich material such as coal, and petrochemicals. However, in this specification, carbonaceous material includes any carbon material whether in solid, liquid, gas, or plasma state. Among the numerous items that can be considered carbonaceous material, the present disclosure contemplates: carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol coproducts, spent grain, spent microorganisms, or their combinations.

The term "fibersoft" or "Fibersoft" or "fibrosoft" or "fibrousoft" means a type of carbonaceous material that is produced as a result of softening and concentration of various substances; in an example carbonaceous material is produced via steam autoclaving of various substances. In another example, the fibersoft can comprise steam autoclaving of municipal, industrial, commercial, medical waste resulting in a fibrous mushy material.

The term "municipal solid waste" or "MSW" or "msw" means waste comprising household, commercial, industrial and/or residual waste.

The term "syngas" or "synthesis gas" means synthesis gas which is the name given to a gas mixture that contains varying amounts of carbon monoxide and hydrogen. Examples of production methods include steam reforming of natural gas or hydrocarbons to produce hydrogen, the gasification of coal and in some types of waste-to-energy gasification facilities. The name comes from their use as intermediates in creating synthetic natural gas (SNG) and for producing ammonia or methanol. Syngas comprises use as an intermediate in producing synthetic petroleum for use as a fuel or lubricant via Fischer-Tropsch synthesis and previously the Mobil methanol to gasoline process. Syngas consists primarily of hydrogen, carbon monoxide, and some carbon dioxide, and has less than half the energy density (i.e., BTU content) of natural gas. Syngas is combustible and often used as a fuel source or as an intermediate for the production of other chemicals.

"Ton" or "ton" refers to U.S. short ton, i.e. about 907.2 kg (2000 lbs).

As used herein, the term "tar" includes, without limitation, a gaseous tar, a liquid tar, a solid tar, a tar-forming substances, or mixtures thereof, which generally comprise hydrocarbons and derivatives thereof. A large number of well known tar measurement methods exist that may be utilized to measure tar. One large family of techniques includes analytical methods based on liquid or gas phase chromatography coupled with a detector. The most frequent detectors in the case of measurement of tars are the flame-ionization detector (FID) and the mass spectrometer. Another family of techniques includes spectrometric methods, which include detecting and analyzing a spectrum. This is for example infrared, ultraviolet (UV) or luminescence spectrometry, and LIBS (Laser-Induced Breakdown Spectroscopy) technique. Another technique for monitoring of combustion gases is FTIR (Fourier Transform InfraRed) infrared spectrometry. Miscellaneous documents mention this technique, such as for example WO2006015660, WO03060480 and U.S. Pat. No. 5,984,998.

There exist other known electronic methods which allow continuous monitoring of tars. These techniques include detectors with electrochemical cells and sensors with semiconductors. Various gravimetric techniques may also be utilized for tar measurements. In one aspect, the amount of tar may be expressed as equivalent ppm of carbon. In this aspect, the hydrocarbon may be benzene or an alcohol, such as methanol. In this aspect, reducing content of tar may mean a tar concentration equivalent or tar equivalents corresponding to less than about 10 ppm benzene.

Detailed Description

The following description is not to be taken in a limiting sense, but is made merely for the purpose of describing the general principles of exemplary embodiments. The scope of the invention should be determined with reference to the claims.

Apparatus and methods for treatment of tar containing syngas to reduce its tar content are provided. In another aspect, apparatus and methods for gasification of carbonaceous material to produce a tar containing syngas and subsequent heat treatment of said tar containing syngas are provided. Various aspects of the apparatus of this disclosure are illustrated in FIGS. 1 to 3.

Figure 1:
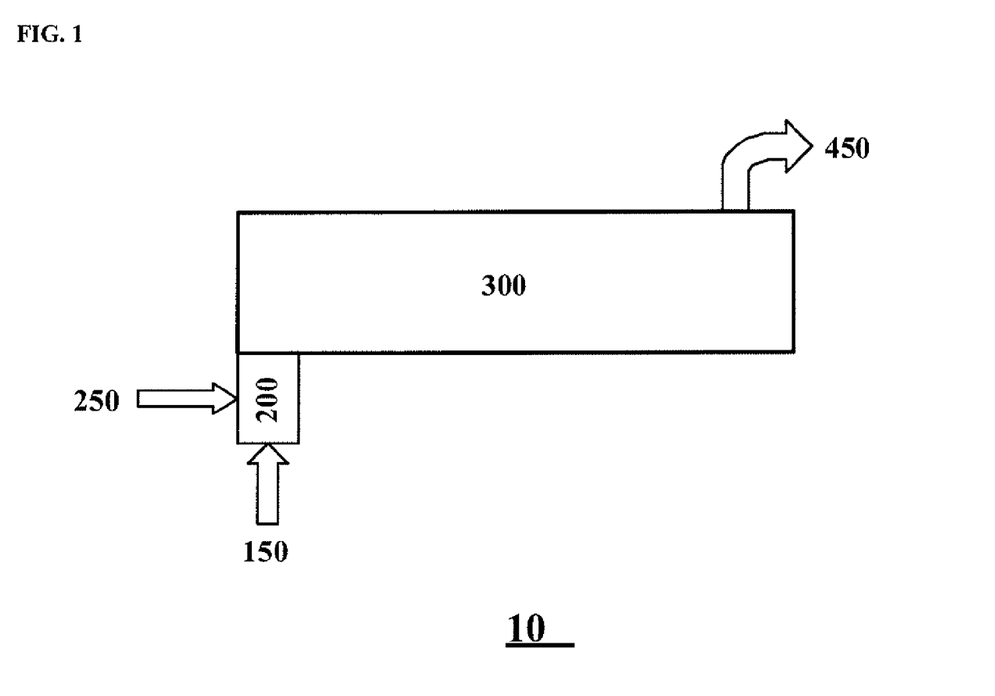
FIG. 1 is a schematic diagram of a tar reduction apparatus for reducing tar content of a tar containing syngas.

FIG. 1 is a schematic diagram of one aspect of a tar reduction apparatus (10) for reducing tar content of a tar containing syngas. FIG. 1 illustrates one aspect of the apparatus that includes a First Reaction Zone (200) and a Heat Treatment Zone (300). Referring now to FIG. 1, tar containing syngas (150) and molecular oxygen containing gas (250) are introduced into said first reaction zone. A gas mixture (mixture of tar containing syngas and molecular oxygen) is produced in the first reaction zone that enters the heat treatment zone (not shown on diagram). A stream of hot syngas (450) is removed from the heat treatment zone.

Figure 2:
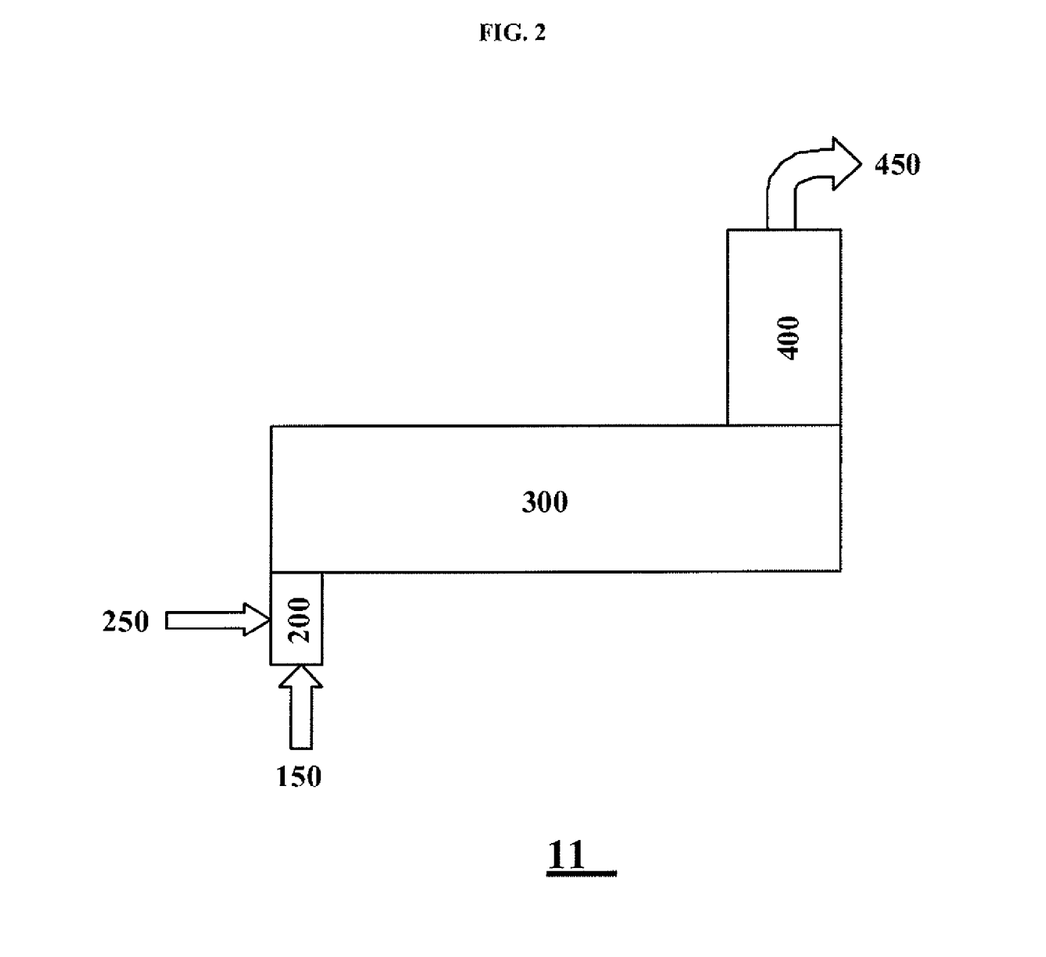
FIG. 2 is a schematic diagram of a tar reduction apparatus for reducing tar content of a tar containing syngas.

FIG. 2 is a schematic diagram of one aspect of a tar reduction apparatus (11) for reducing tar content of a tar containing syngas. FIG. 2 illustrates one aspect of said apparatus comprising a First Reaction Zone (200) and a Heat Treatment Zone comprising Heat Treatment Zone I (300) and Heat Treatment Zone II (400). Referring now to FIG. 2, tar containing syngas (150) and molecular oxygen containing gas (250) are introduced into said first reaction zone. A gas mixture (mixture of tar containing syngas and molecular oxygen) is produced in the first reaction zone that enters the heat treatment zone I (not shown on diagram). A heat treated gas mixture leaves heat treatment zone I and enters heat treatment zone II. A stream of hot syngas (450) is removed from the heat treatment zone II.

Figure 3:
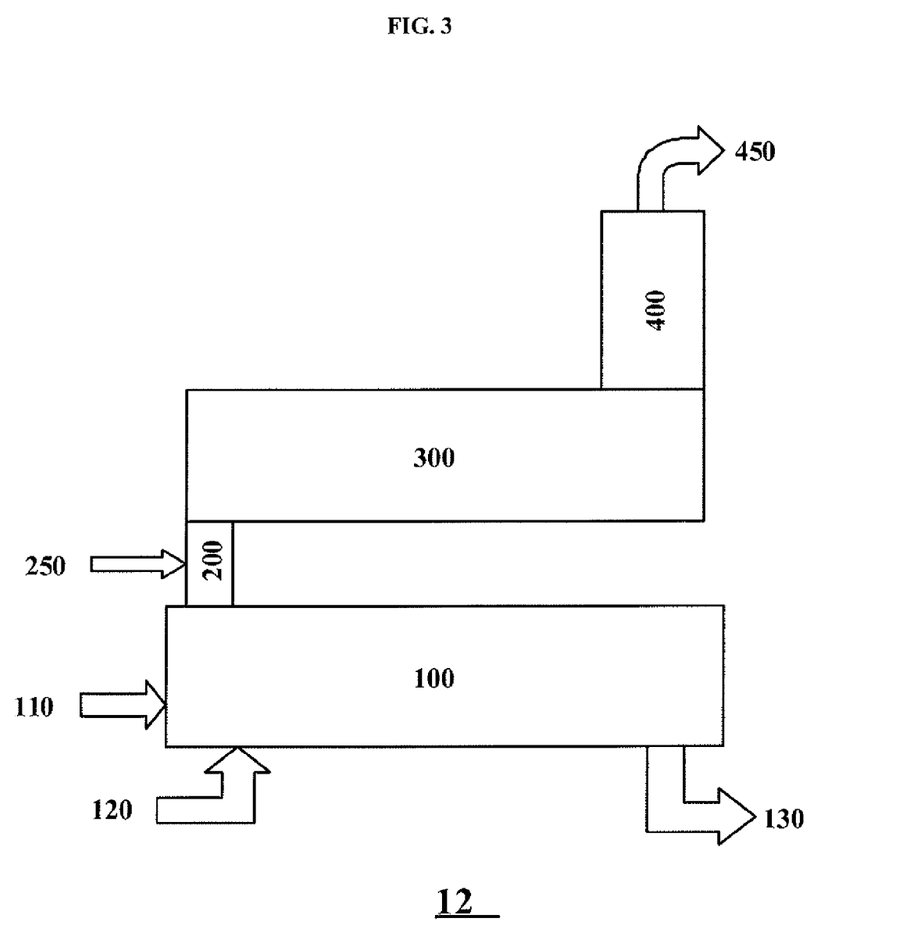
FIG. 3 is a schematic diagram of a gasification apparatus for reducing tar content of a tar containing syngas.

FIG. 3 is a schematic diagram of a gasification apparatus (12) for reducing tar content of a tar containing syngas. FIG. 3 illustrates one aspect of said apparatus comprising a Gasification Zone (100), a First Reaction Zone (200) and a Heat Treatment Zone comprising Heat Treatment Zone I (300) and Heat Treatment Zone II (400). Referring now to FIG. 3, carbonaceous material feed (110) and molecular oxygen containing gas (120) are introduced into the gasification zone that produces a tar containing syngas (not shown on diagram). Said tar containing syngas and molecular oxygen containing gas (250) are introduced into the first reaction zone. A gas mixture (mixture of tar containing syngas and molecular oxygen) is produced in the first reaction zone that enters the heat treatment zone I (not shown on diagram). A heat treated gas mixture leaves heat treatment zone I and enters heat treatment zone.

Thus the tar treatment apparatus includes a first reaction zone and a heat treatment zone. Tar containing syngas feed is passed through the first reaction zone. The first reaction zone can be a small pipe section or a small vessel of any cross section including but not limited to circular or rectangular cross section one end of which is attached to the heat treatment zone. In one aspect, the cross section of the first reaction zone is circular. In one aspect, the first reaction zone is positioned vertically.

Figure 4:
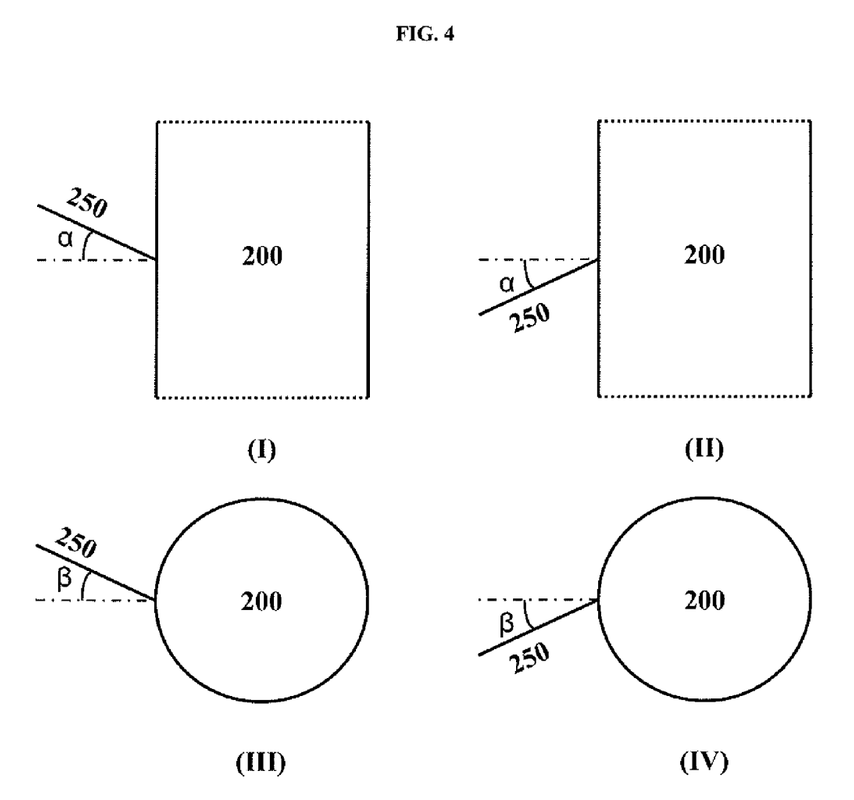
FIG. 4 presents side and top views of aspects of the first reaction zone wherein the first reaction zone is cylindrical in shape.

A molecular oxygen containing gas is introduced into the first reaction zone. One or more gas inlets (nozzles) might be attached to the first reaction zone for introduction of molecular oxygen containing gas. One or more of said nozzles can be positioned perpendicular to the axis of the first reaction zone as shown in FIGS. 4 (I) & 4 (II). FIG. 4 (I) illustrates an aspect of the first reaction zone wherein gas inlet for molecular oxygen is inclined at an angle α to horizontal line with a downward flow direction. FIG. 4 (I) presents a side view of an aspect of the first reaction zone wherein the first reaction zone is vertical and gas inlet for molecular oxygen is inclined at an angle α to horizontal line with a downward flow direction. FIG. 4 (II) illustrates an aspect of the first reaction zone wherein gas inlet for molecular oxygen is inclined at an angle α to horizontal line with an upward flow direction. FIG. 4 (II) presents a side view of an aspect of the first reaction zone wherein the first reaction zone is vertical and gas inlet for molecular oxygen is inclined at an angle α to horizontal line with an upward flow direction.

One or more of said nozzles can be positioned obliquely to a diagonal drawn through point of intersection of the surface of the first reaction zone and axis of the gas inlet and positioned in a way that facilitates formation of swirl inside the mixing zone. FIGS. 4 (III) & 4 (IV) respectively present top views or cross sections of an aspect of the first reaction zone wherein the first reaction zone is vertical and gas inlet for molecular oxygen is inclined at an angle β to a diagonal drawn through point of intersection of the cross section and axis of the gas inlet.

Figure 5:
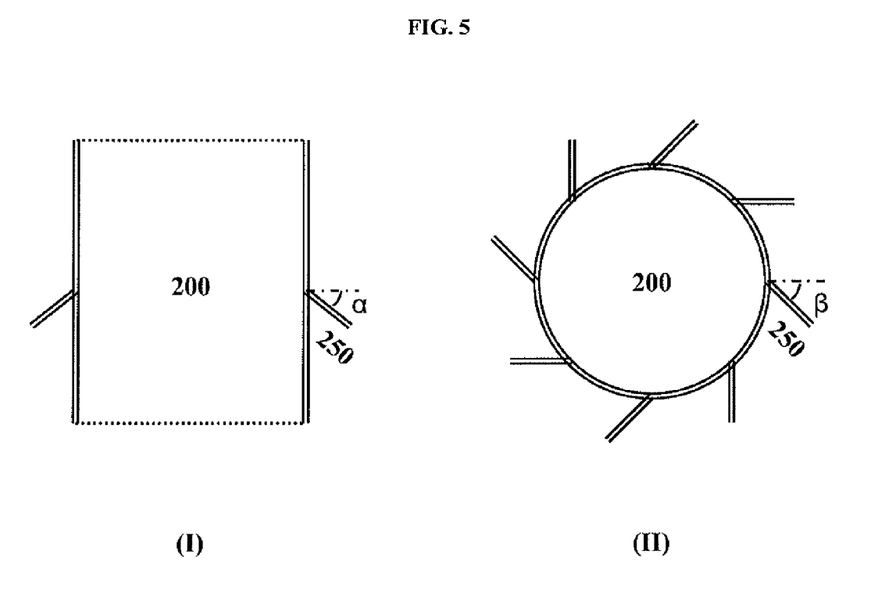
FIG. 5 presents side and top views of an aspect of the first reaction zone wherein the first reaction zone is a vertical cylindrical vessel with eight gas inlet nozzles attached to it for introducing molecular oxygen.

FIGS. 5 (I) & 5 (II) respectively present side and top views respectively of an aspect of the first reaction zone wherein the first reaction zone is a vertical cylindrical vessel with eight gas inlet nozzles attached to it for introducing molecular oxygen. Each nozzle is mounted at an angle α with horizontal direction with an upward direction of gas flow. Each nozzle is mounted at an angle β to a diagonal of cross section drawn through point of intersection of nozzle and first reaction zone.

Figure 6:
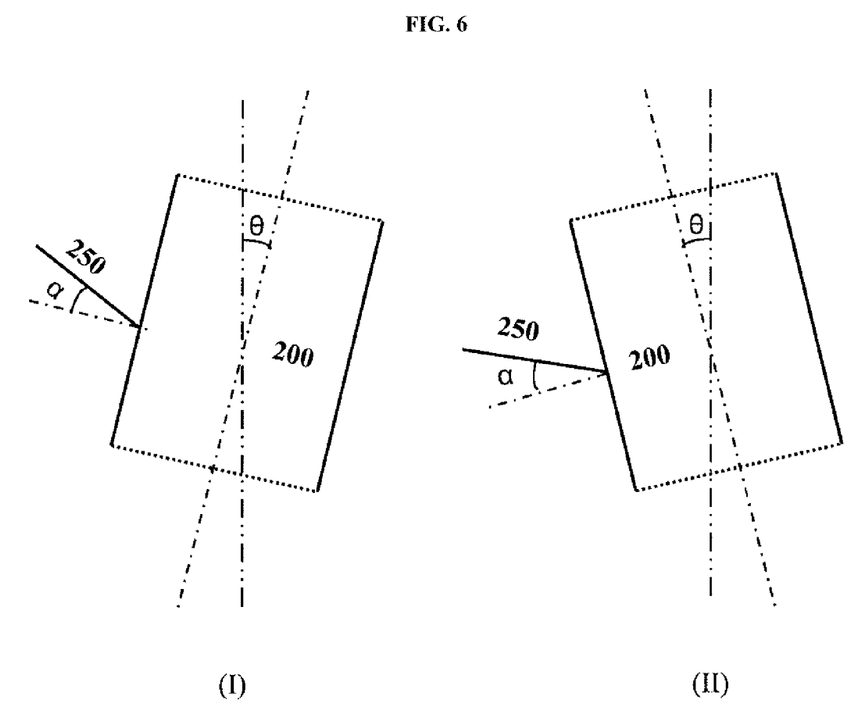
FIG. 6 presents side views of aspects of the first reaction zone.

In various aspects, the first reaction zone can be positioned at an angle to the vertical direction. FIGS. 6 (I) & 6 (II) respectively present side views of aspects of the first reaction zone wherein the first reaction zone is inclined at an angle θ to a vertical line.

The heat treatment zone is a vessel of any cross section including but not limited to circular, square, rectangular, etc. In one aspect, the heat treatment zone is positioned substantially vertically. In one aspect, the heat treatment zone is positioned substantially horizontally. In one aspect, the heat treatment zone is positioned at an angle to the horizontal direction. In one aspect, the heat treatment zone comprises multiple sections or sub-zones. In one aspect, the heat treatment zone comprises two sections or sub-zones: Heat Treatment Zone I and Heat Treatment Zone II. In one aspect heat treatment zone I is horizontal. In one aspect heat treatment zone I is vertical. In one aspect heat treatment zone II is horizontal. In one aspect heat treatment zone II is vertical. In one aspect, heat transfer zone I is positioned at an angle to the horizontal direction. In one aspect, heat transfer zone II is positioned at an angle to the horizontal direction. In one aspect, heat transfer zone I is positioned at an angle to the vertical direction. In one aspect, heat transfer zone II is positioned at an angle to the vertical direction.

In one aspect, a tar containing syngas is subjected to heat treatment in a heat treatment zone in order to accomplish destruction of tar by one or more of cracking and partial oxidation wherein said tar containing syngas is mixed with molecular oxygen containing gas prior to introduction in the heat treatment zone. Mixing is accomplished in a first reaction zone through which tar containing syngas is introduced into said heat treatment zone. Effectiveness of heat treatment in heat treatment zone can depend on effectiveness of mixing. Effectiveness of heat treatment can be improved by attaining a specified minimum linear velocity of gas mixture (tar containing syngas oxygen mixture) entering the heat treatment zone. Effectiveness of heat treatment can be improved by changing the direction of flow of the gas mixture as it enters the heat treatment zone. Effectiveness of heat treatment can be improved by impingement on a surface as it enters the heat treatment zone. Effectiveness of heat treatment can be improved by changing direction of flow of gas mixture entering the heat treatment zone by impingement on a surface. In one aspect, effectiveness of heat treatment can be improved by impingement of the gas mixture from the first reaction zone on a surface of the heat treatment zone.

In one aspect, a linear velocity of gas mixture at the exit of the first reaction zone is at least 5 meters/second. In one aspect, a linear velocity of gas mixture is at least 10 meters/second. In one aspect, a linear velocity of gas mixture is at least 15 meters/second. In one aspect, a linear velocity of gas mixture is at least 20 meters/second. In one aspect, a linear velocity of gas mixture is at least 25 meters/second. In one aspect, a linear velocity of gas mixture is at least 50 meters/second. The height of the heat treatment zone may be in a range of from about 1 meter to about 15 meters. In another aspect, a ratio of linear velocity to height of the heat treatment zone is about 0.3:12.5 to about 2.0:2.5. In various aspects, the ratio of linear velocity to height of the heat treatment zone may be selected from 0.3:12.5, 0.4:10.0, 0.5:7.5, 0.6:6.25, 0.8:5.0, 1.0:4.0, 1.25:3.75, 1.5:3.3, 1.7:3.0, and 2.0:2.5. Linear velocity is measured at the exit of the first reaction zone. If the heat treatment zone is square or rectangular, then the height is the inside height. If the heat treatment zone is circular, than the height is the inside diameter. In another aspect, the gas mixture from the first reaction zone impinges on a surface in less that about 2 seconds, in another aspect less than about 1 second, in another aspect less than about 0.5 seconds, and in another aspect less than about 0.1 seconds.

Factors that can affect mixing and performance of heat treatment include but are not limited to mixing length provided by the first reaction zone (e.g. height of first reaction zone), shape and cross sectional area of first reaction zone, ratio of molecular oxygen containing gas to tar containing syngas, ratio of length to diameter of first reaction zone downstream of the oxygen inlet. Number and orientation of gas inlets (nozzles) for introducing molecular oxygen containing gas can influence mixing. Mixing can also be improved by inserting mixing devices inside first reaction zone such as baffles or motionless mixers. Mixing and performance of heat treatment can be improved by increasing flow rate of gas through the first reaction zone or heat treatment zone. For example in one aspect, performance of heat treatment can be improved by recycling a portion of syngas exiting the heat treatment zone (hot syngas). In another aspect, performance of heat treatment can be improved by feeding tar containing raw syngas from more than one source through one first reaction zone and one heat treatment zone. In one aspect, performance of heat treatment can be improved by feeding tar containing raw syngas from more than one gasifier through one first reaction zone and one heat treatment zone.

In order to accomplish one or more of partial oxidation and cracking of tar, the heat treatment zone is maintained at a temperature between about 900° C. to about 2000°. In one aspect, the temperature is between about 1000° C. and about 1700° C. In one aspect, the temperature is between about 1100° C. and about 1500° C. In one aspect, the temperature is between about 1200° C. and about 1250° C.

In order to accomplish one or more of partial oxidation and cracking of tar effectively, the contact time in the heat treatment zone is between about 0.5 to about 5 seconds. In these aspects, the process is effective for reducing the tar content of the syngas by at least about 10%.

The molecular oxygen containing gas may comprise air. The molecular oxygen containing gas may comprise oxygen enriched air. The molecular oxygen containing gas may comprise pure oxygen. Total amount of molecular oxygen added in the tar reduction zone can be in a range of about 0 to about 100 lb-moles per dry ton of carbonaceous material on a dry basis.

The gasification zone of the present disclosure may be any gasification equipment disclosed in prior art such as and not limited to moving bed, fixed bed, fluidized bed, entrained flow, counter-current ("up draft"), co-current ("down draft"), counter-current fixed bed, co-current fixed bed, counter-current moving bed, co-current moving bed cross draft, hybrid, cross flow, cross flow moving bed, or a part thereof, or combinations thereof. In one aspect, the gasification zone is a cross flow moving bed unit. In one aspect, the gasification zone comprises two or more units or sections or hearths for contacting said carbonaceous material with molecular oxygen-containing gas and optionally with one or more of steam and $CO_2$ to gasify said carbonaceous material and to produce a tar containing syngas. In various aspects, the gasification zone comprises 1, 2, 3, 4, 5, 6, 7, 8, 9, or 10 units or sections or hearths.

Gas inlets for introduction of molecular oxygen containing gas can be attached to the gasification zone or one or more sections or units or hearths contained therein. Steam or $CO_2$ may also be introduced, optionally through one or more of these molecular oxygen inlets. In one aspect, one or more of molecular oxygen containing gas, steam and $CO_2$ may be introduced through the gas inlets attached to the gasification zone or to one or more hearths or sections or units contained therein. In one aspect, one or more of molecular oxygen containing gas, steam and $CO_2$ are pre-mixed prior to supplying to the gas inlets attached to the gasification zone or to one or more hearths or sections or units contained therein.

A carbonaceous material feed is introduced in the gasification zone. A molecular oxygen containing gas is supplied to the gasification zone. Thus the carbonaceous material feed is treated with molecular oxygen in order to initiate and facilitate chemical transformation of carbonaceous material. Carbonaceous material feed is gasified in the gasification zone to produce a tar containing syngas. Supply of oxygen into the gasification apparatus is controlled in order to preferentially promote formation of carbon monoxide from carbonaceous material. A sub-stoichiometric amount of oxygen is supplied in order to promote production of carbon monoxide. A stream of tar containing syngas is removed from the gasification zone.

A high enough temperature is attained in the gasification zone to facilitate gasification of carbonaceous material. However, the temperature is maintained low enough so that non-carbonaceous mineral matter contained in carbonaceous material feed does not melt inside the gasification zone. In other words, the temperature in any part of the gasification zone may not exceed the melting point temperature of ash comprising said non-carbonaceous mineral matter. Typically, a temperature not exceeding 800° C. is maintained in the gasification zone as well as in the burn-up zone. In one aspect, temperature in the gasification zone is maintained in 250° C.-800° C. range. Thus solid ash comprising said non-carbonaceous mineral matter accumulates in the gasification zone and a stream of solid ash is removed from the gasification zone. In various aspects, temperature in the gasification zone can be in 250° C.-800° C. range, in 450° C.-800° C. range, in 650° C.-800° C. range.

In order to supply molecular oxygen said molecular oxygen containing gas may comprise air. In order to supply molecular oxygen said molecular oxygen containing gas may comprise enriched air. In order to supply molecular oxygen said molecular oxygen containing gas may comprise pure oxygen.

Total amount of molecular oxygen introduced in the gasification zone through said molecular oxygen containing gas can be in a range of about 0 to about 50 lb-moles per ton of carbonaceous material on a dry basis. Total amount of steam introduced in the gasification zone can be in a range of about 0 to about 100 lb-moles per ton of carbonaceous material feed on a dry basis, and in another aspect, about 0 to about 50 lb-moles per ton of carbonaceous material feed on a dry basis. Total amount of carbon dioxide gas introduced in the gasification zone can be in the range of about 0 to about 50 lb-moles per ton of carbonaceous material feed on a dry basis. In one aspect, both steam and carbon dioxide gas are introduced in the gasification zone. In one aspect, one or more of steam and carbon dioxide gas are injected in one or more lines supplying oxygen to blend in with oxygen lines just before distribution nozzle.

The carbonaceous material fed to the gasification zone may comprise selection from: carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, or their combinations.

In one aspect of the present disclosure the carbonaceous material fed to the gasification zone comprises a plurality of carbonaceous materials selected from carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co-products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, or their combinations.

While the invention herein disclosed has been described by means of specific embodiments, examples and applications thereof, numerous modifications and variations could be made thereto by those skilled in the art without departing from the scope of the invention set forth in the claims.

What is claim is:

1. A process for reducing content of tar in a tar containing syngas, said process comprising:
    contacting said tar containing syngas with a molecular oxygen containing gas in a first reaction zone to produce a gas mixture; and
    passing said gas mixture through a heat treatment zone maintained at a temperature between about 900° C. to about 2000° C. for a contact time of about 0.5 to about 5 seconds wherein at least a portion of the tar undergoes at least partial oxidation and/or cracking to produce a hot syngas;
    wherein the gas mixture from the first reaction zone changes direction of flow by impingement on a surface.

2. The process of claim 1 wherein said heat treatment zone is maintained at a temperature between about 1000° C. to 1500° C.

3. The process of claim 1 wherein said heat treatment zone is maintained at a temperature between about 1200° C. to 1250° C. range.

4. The process of claim 1 wherein a linear velocity of a flow of said tar containing syngas oxygen mixture at an exit of said first reaction zone is greater than about 5 meters per second.

5. The process of claim 1 further comprising introducing at least a portion of hot syngas into the first reaction zone.

6. The process of claim 4 wherein a ratio of linear velocity (meters/second) to height of the heat treatment zone (meters) is about 0.3:12.5 to about 2.0:2.5.

7. The process of claim 1 wherein the heat treatment zone comprises:
    (a) a first heat treatment zone effective for thermal treatment of tar contained in the gas mixture to produce a less tar containing gas mixture; and
    (b) a second heat treatment zone effective for thermal treatment of tar contained in said less tar containing gas mixture to produce hot syngas.

8. A process for producing hot syngas comprising:
    treating a carbonaceous material with a molecular oxygen containing gas and optionally with one or more of steam and carbon dioxide in a gasification zone to produce a tar containing syngas;
    passing said tar containing syngas and a molecular oxygen containing gas through a first reaction zone to produce a gas mixture, wherein a linear velocity of a flow of said tar containing syngas oxygen mixture at an exit of said first reaction zone is greater than about 5 meters per second; and passing said gas mixture through a heat treatment zone maintained at a temperature of about 900° C. to about 2000° C. for a contact time of about 0.5 to about 5 seconds range wherein at least a portion of the tar undergoes one or more of partial oxidation and cracking to produce a hot syngas;

wherein the gas mixture from first reaction zone changes direction of flow by impingement on a surface, wherein a ratio of linear velocity (meters/second) to height (meters) of the heat treatment zone is about 0.3:12.5 to about 2.0:2.5.

9. A process for reducing content of tar in a tar containing syngas comprising:

contacting said tar containing syngas with a molecular oxygen containing gas in a first reaction zone to produce a gas mixture, wherein a linear velocity of a flow of said tar containing syngas oxygen mixture at an exit of said first reaction zone is greater than about 5 meters per second; and passing said gas mixture through a heat treatment zone at a temperature and for a time effective for reducing tar content of the syngas by at least about 10%;

wherein the gas mixture from the first reaction zone changes direction of flow by impingement on a surface, wherein a ratio of linear velocity (meters/second) to height (meters) of the heat treatment zone is about 0.3:12.5 to about 2.0:2.5.

10. A process for reducing content of tar in a tar containing syngas, said process comprising:

contacting said tar containing syngas with a molecular oxygen containing gas in a first reaction zone to produce a gas mixture, wherein a linear velocity of a flow of said tar containing syngas oxygen mixture at an exit of said first reaction zone is greater than about 5 meters per second; and passing said gas mixture through a heat treatment zone maintained at a temperature (T) between about 900° C. to about 2000° C. for a contact time (Ct) of about 0.5 to about 5 seconds wherein at least a portion of the tar undergoes at least partial oxidation and/or cracking to produce a hot syngas;

wherein the tar concentration equivalent content of the hot syngas is maintained at less than 10 ppm, wherein a ratio of linear velocity (meters/second) to height (meters) of the heat treatment zone is about 0.3:12.5 to about 2.0:2.5.

11. The process of claim 10 wherein the tar concentration equivalent content of the hot syngas is maintained at less than 10 ppm through control of the temperature (T) and/or the contact time (Ct).

* * * * *